United States Patent
Srivastava et al.

(10) Patent No.: US 7,912,189 B2
(45) Date of Patent: Mar. 22, 2011

(54) FAILOVER VOICE MESSAGING

(75) Inventors: Pushkar Srivastava, Santa Clara, CA (US); Danelle Tai-Ling Au, Los Altos, CA (US); Ravindra Koulagi, San Jose, CA (US); Vallinath Panchagnula, Sunnyvale, CA (US); Ashutosh Alawani, Fremont, CA (US)

(73) Assignee: Cisco Technology, Inc., San Jose, CA (US)

( * ) Notice: Subject to any disclaimer, the term of this patent is extended or adjusted under 35 U.S.C. 154(b) by 1041 days.

(21) Appl. No.: 11/686,494

(22) Filed: Mar. 15, 2007

(65) Prior Publication Data
US 2008/0226043 A1 Sep. 18, 2008

(51) Int. Cl.
*H04M 1/64* (2006.01)
(52) U.S. Cl. ........................ 379/88.25; 379/279; 370/401
(58) Field of Classification Search ............... 379/88.18, 379/279, 88.25; 370/401
See application file for complete search history.

(56) References Cited

U.S. PATENT DOCUMENTS

| | | |
|---|---|---|
| 6,625,142 B1 | 9/2003 | Joffe et al. |
| 6,625,256 B1 | 9/2003 | Tasker et al. |
| 6,931,103 B1 | 8/2005 | Tasker et al. |
| 7,158,509 B2 * | 1/2007 | Beyda ........................... 370/352 |
| 7,532,710 B2 * | 5/2009 | Caputo et al. ............... 379/88.18 |
| 2003/0181209 A1 * | 9/2003 | Forte ............................ 455/445 |

OTHER PUBLICATIONS

Cisco CallManager, http://en.wikipedia.org/wiki/Cisco_,CallManager, Jan. 1, 2007, 2 pages.
Cisco Unity Express, http://en.wikipedia.org/wiki/Cisco_Unity_Express, Jan. 5, 2007, 1 page.

* cited by examiner

*Primary Examiner* — Simon Sing
*Assistant Examiner* — Simon King
(74) *Attorney, Agent, or Firm* — Haynes and Boone, LLP

(57) ABSTRACT

An improved approach to failover voice messaging services is provided. In one example, a method includes detecting a network communication interruption between a branch office and a main office, provisioning a mailbox of a failover voice messaging system of the branch office, and receiving an incoming call at the branch office. The method also includes routing the incoming call to the mailbox, storing a message associated with the incoming call in the mailbox, and detecting a restored network connection between the branch office and the main office. The method further includes synchronizing the message between the mailbox of the failover voice messaging system of the branch office and a corresponding mailbox of a voice messaging system of the main office in response to the restored network connection. Failover voice messaging systems supporting such features are also provided.

16 Claims, 6 Drawing Sheets

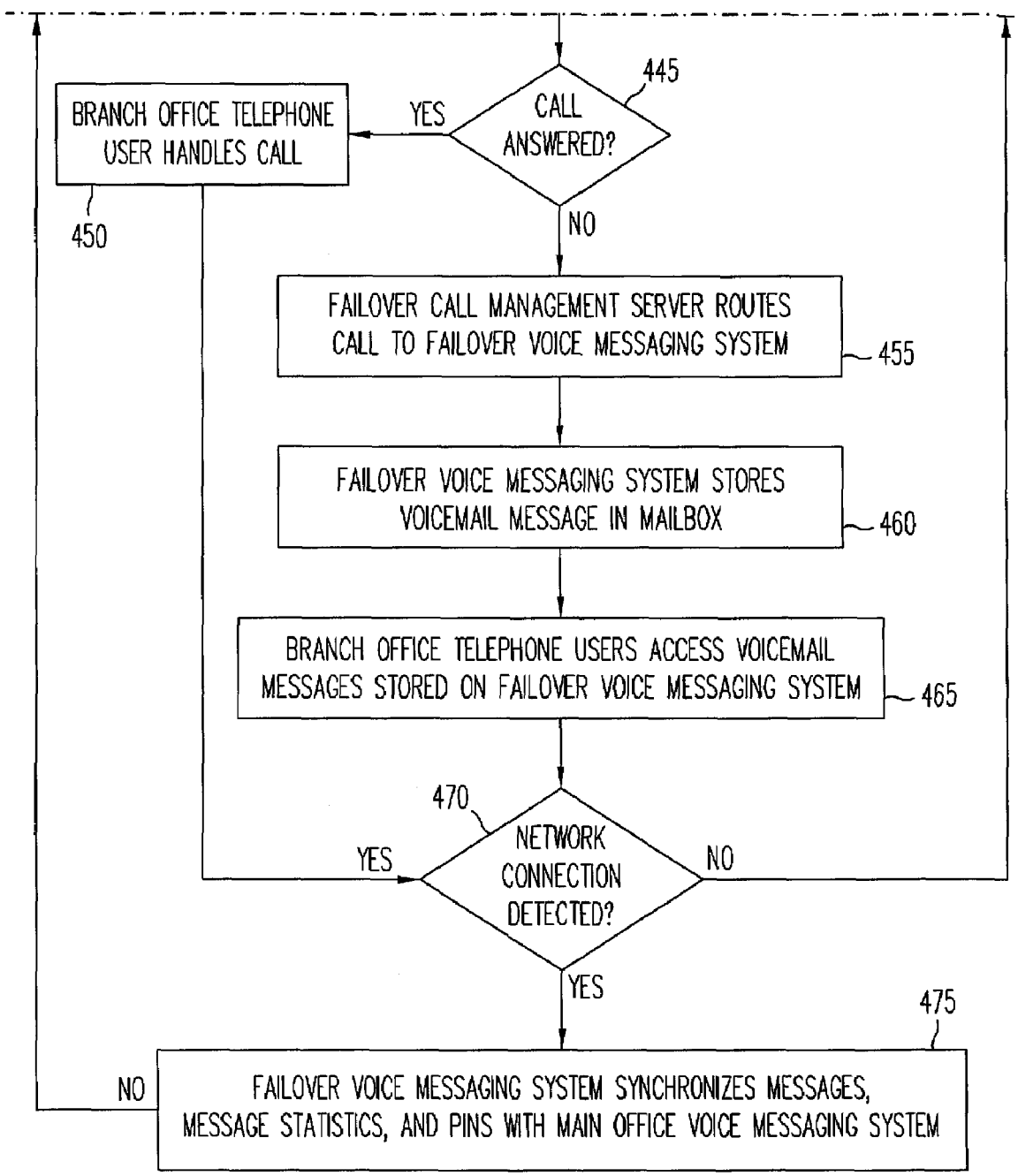

FAILOVER VOICE MESSAGING

TECHNICAL FIELD

The present disclosure relates generally to voice messaging systems.

BACKGROUND

Internet Protocol (IP) based telephony systems are often implemented with a centralized architecture. Such systems typically include a call control system deployed at one main office of an enterprise. The call control system may provide call management and voice messaging services from the main office to remote branch offices of the enterprise. This centralized architecture is attractive to many enterprises in that it enables system administrators to easily provision and manage the call control system from the main office. IP-based telephones at the branch offices may be connected with the main office over a wide area network (WAN). Telephone users at the branch offices may remotely access services from the main office call control system over the WAN, such as retrieving voice messages stored by the call control system.

Unfortunately, such configurations can be seriously impacted by WAN communication interruptions. For example, in the event of a WAN outage, IP-based phones at the branch offices will be unable to access services of the main office. In particular, voice messages stored by the call control system of the main office will be unavailable to users at the branch offices. This can detrimentally affect the business and customer response times of the branch office users.

One approach to handling such problems uses a decentralized telephony system architecture with multiple complete call control systems. In this case, a complete call control system with call management and voice messaging services may be located at each branch office. The individual call control systems are independently operated and therefore are not subject to service interruptions due to WAN failures between the main office and branch offices.

However, such an approach fails to provide the implementation flexibility offered by a centralized architecture. For example, when a remote user relocates to a different branch office, the user's voice mailbox cannot be seamlessly moved between the different call control systems of the branch offices. In addition, this decentralized approach fails to provide the scalability offered by a centralized architecture. Indeed, the cost and time associated with managing of multiple complete call control systems at every branch office can be cost prohibitive for many enterprises.

BRIEF DESCRIPTION OF THE DRAWINGS

Like element numbers in different figures represent the same or similar elements.

DESCRIPTION

Overview

Figure 1:
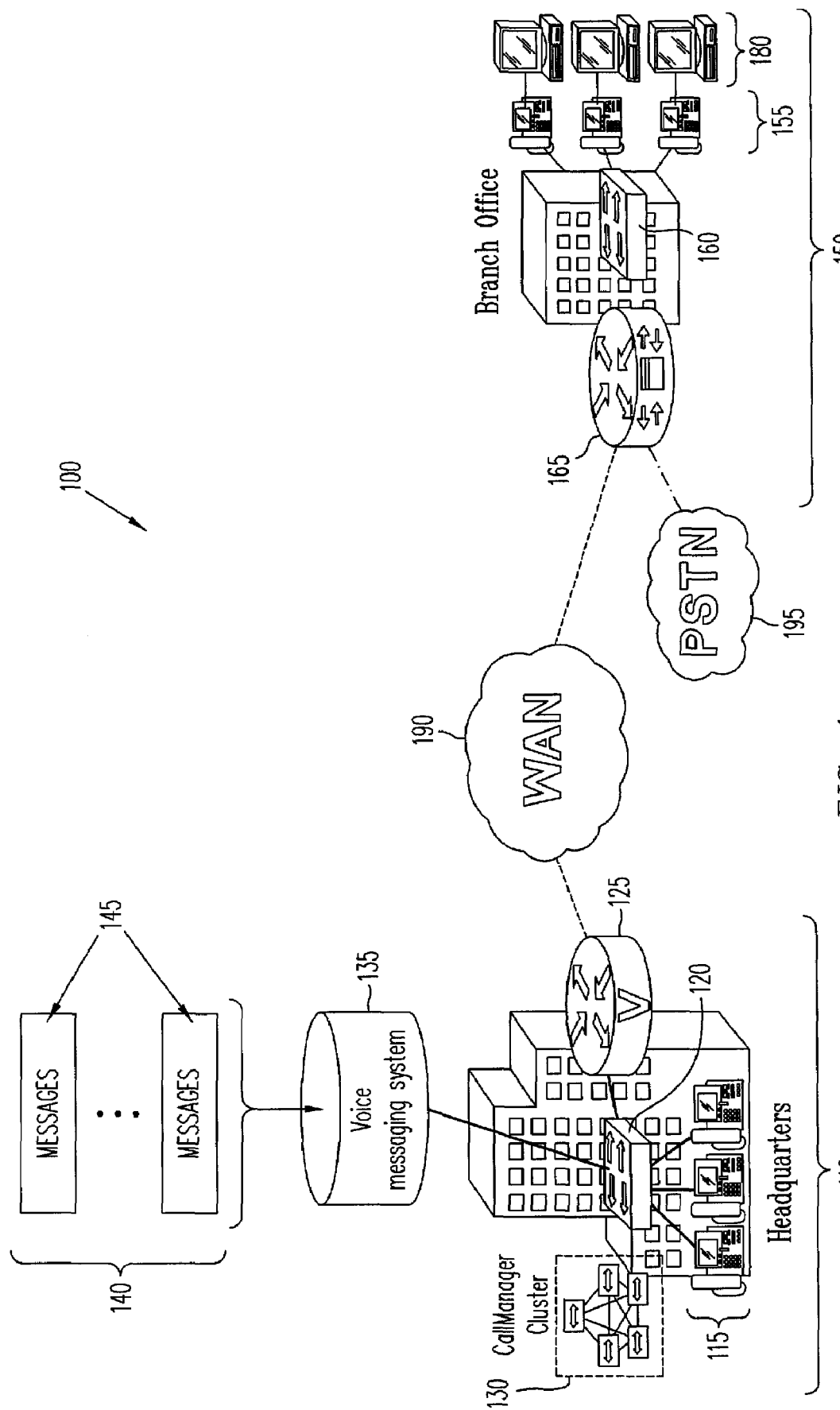
FIG. 1 illustrates a block diagram of a networked telephony system in accordance with an embodiment of the invention.

In accordance with an embodiment of the invention, a method includes detecting a network communication interruption between a branch office and a main office, provisioning a mailbox of a failover voice messaging system of the branch office, and receiving an incoming call at the branch office. The method also includes routing the incoming call to the mailbox, storing a message associated with the incoming call in the mailbox, and detecting a restored network connection between the branch office and the main office. The method further includes synchronizing the message between the mailbox of the failover voice messaging system of the branch office and a corresponding mailbox of a voice messaging system of the main office in response to the restored network connection.

In accordance with another embodiment of the invention, a system includes a failover call management server adapted to process telephone calls received by a branch office during a network communication interruption between the branch office and a main office. The system also includes a failover voice messaging system. The system further includes a mailbox maintained by the failover voice messaging system and adapted to store a message associated with one of the telephone calls. The failover voice messaging system is adapted to synchronize the message between the mailbox of the failover voice messaging system of the branch office and a corresponding mailbox of a voice messaging system of the main office in response to a restored network connection between the branch office and the main office.

In accordance with another embodiment of the invention, a system includes means for detecting a network communication interruption between a branch office and a main office, means for receiving a plurality of incoming calls at the branch office, and means for storing at the branch office a message associated with one of the incoming calls. The system also includes means for detecting a restored network connection between the branch office and the main office. The system further includes means for synchronizing the message between the storing means and a corresponding storing means at the main office in response to the restored network connection.

These and other features and advantages will be more readily apparent from the description of example embodiments set forth below taken in conjunction with the accompanying drawings.

DESCRIPTION OF EXAMPLE EMBODIMENTS

In accordance with various embodiments further described herein, a failover voice messaging system is provided that can be used by remote branch offices when access to a centralized voice messaging system is unavailable, for example, due to WAN communication interruptions. In one embodiment, such a failover voice messaging system may be a software-based system running on a router, switch, or other network device that lies dormant until WAN failover and loss of connectivity to a centralized voice messaging system is experienced. Voice messaging calls received by the branch office during a WAN failover condition may be routed to the failover voice messaging system by a failover call management server at the branch office. After connectivity to the centralized voice messaging system is restored, the failover voice messaging system may synchronize information with the centralized voice messaging system.

Referring now to the drawings wherein the showings are for purposes of illustrating example embodiments only, and not for purposes of limiting the same, FIG. 1 illustrates a block diagram of a networked telephony system 100 in accordance with an embodiment of the invention. System 100 includes various components located at a main office 110 (labeled "Headquarters") and at a branch office 150. It will be appreciated that main office 110 and branch office 150 may be, for example, offices of a business or other enterprise having a plurality of locations. Main office 110 and branch office 150 are connected with a wide area network (WAN) 190 which may be used to facilitate communication between the offices. In various embodiments, WAN 190 may be implemented as one or more electronic networks including but not limited to: the Internet, intranets, landline networks, wireless networks, and/or other networks known in the art. Although a single branch office 150 is illustrated in FIG. 1, system 100 may include a plurality of branch offices 150 connected with main office over WAN 190.

Main office 110 includes a plurality of telephones 115 which may be configured to provide IP-based voice communications. Main office 110 also includes a voice messaging system 135 which may be used to store, for example, voicemail messages associated with incoming telephone calls directed to users of telephones 115. In this regard, voice messaging system 135 may include a plurality of mailboxes 140, each of which may be associated with a user of one of telephones 115 of main office 110, or with a user of one of telephones 155 of branch office 150 as will be further described herein. Each of mailboxes 140 may also have an associated identifier, such as a personal identification number (PIN), which may be used to control access to mailboxes 140.

Main office 110 also includes one or more call management servers 130. For example, in the embodiment illustrated in FIG. 1, a plurality of call management servers 130 are interconnected in a cluster configuration which permits them to share resources. Call management servers 130 may be configured with appropriate call processing software to provide signaling and call control services to distribute and route telephone calls between telephones 115 and 155, voice messaging system 135, and third parties. For example, in one embodiment, call management servers 130 may be implemented as network devices configured to run one or more CallManager applications available from Cisco Systems, Inc. Telephones 115, call management servers 130, and voice messaging system 135 of main office 110 are interfaced with each other through a switch 120 which in turn is connected with WAN 190 through a gateway 125.

Branch office 150 includes a plurality of telephones 155 which may be similarly configured to provide IP-based voice communications. Branch office 150 also includes a gateway 165 having an integrated failover call management server and an integrated failover voice messaging system as will be further described herein. Telephones 155 and gateway 165 are interfaced with each other through a switch 160. As shown, gateway 165 is connected with WAN 190 and a public switched telephone network (PSTN) 195. Branch office 150 also includes a plurality of computing devices 180 which may be connected with telephones 155 and/or switch 160.

Figure 2:
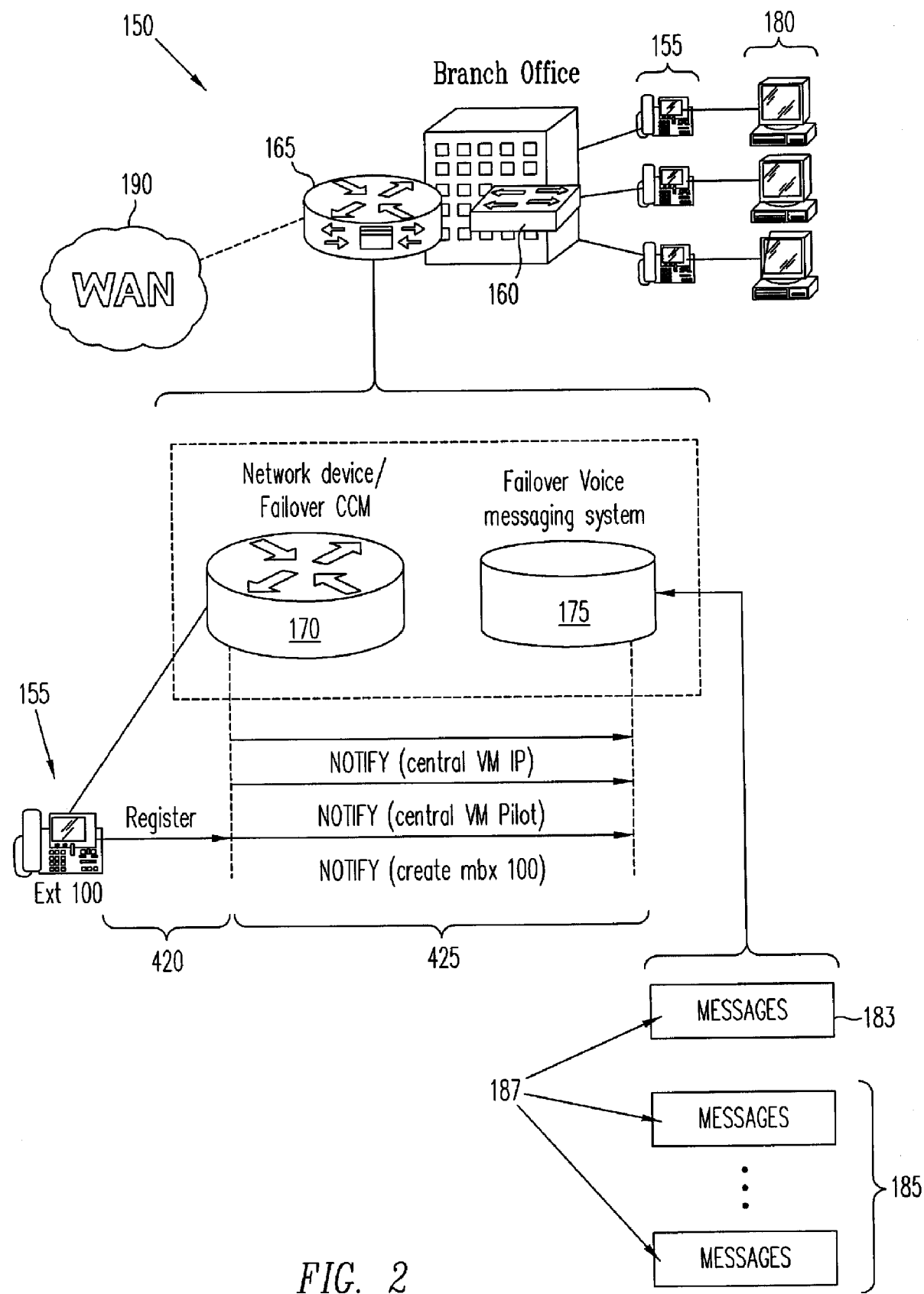
FIG. 2 illustrates a block diagram of a branch office of the networked telephony system of FIG. 1 in accordance with an embodiment of the invention.

FIG. 2 illustrates a block diagram of branch office 150 in accordance with an embodiment of the invention. As shown in FIG. 2, gateway 165 includes an integrated failover call management server 170 and an integrated failover voice messaging system 175. Failover call management server 170 may be configured with appropriate call processing software to provide signaling and call control services to distribute and route telephone calls between telephones 155, failover voice messaging system 175, and third parties. For example, in one embodiment, failover call management server 170 may be implemented as a network device configured to run one or more CallManager applications available from Cisco Systems, Inc.

Although failover call management server 170 and failover voice messaging system 175 are illustrated in FIG. 2 as being integrated with gateway 165, it will be appreciated that they may be implemented at any network device, such as a router, or other computing device provided in branch office 150 which is configured to run software to provide the various aspects of failover call management server 170 and failover voice messaging system 175. For example, in one embodiment, failover call management server 170 and failover voice messaging system 175 may be implemented on one or more processing cards of a router or switch of branch office 110. In another embodiment, failover voice messaging system 175 may be implemented in a server that is also configured with appropriate Unified Survivable Remote Site Telephony (SRST) software available from Cisco Systems, Inc.

Failover voice messaging system 175 may include a general mailbox 183 and/or additional mailboxes 185. In one embodiment, general mailbox 183 may be used to store voicemail messages associated with incoming calls to branch office 150 during a failover condition. For example, calls may be routed to a pilot number associated with general mailbox 183 by an automated attendant answering service provided by failover call management server 170. Additional pilot numbers and/or general mailboxes 183 may also be provided.

Each of mailboxes 185 may be associated with a user of one of telephones 155. Each of mailboxes 185 may also have an associated identifier, such as a personal identification number (PIN) or a particular telephone number, which may be used to control access to mailboxes 185. Advantageously, mailboxes 183 and 185 may be provisioned at the time failover voice messaging system 175 is deployed, in response to a failover condition of WAN 190, in response to the registration of telephones 155 with failover call management server 170, and/or in response to particular incoming calls processed by failover call management server 170.

Figure 3:
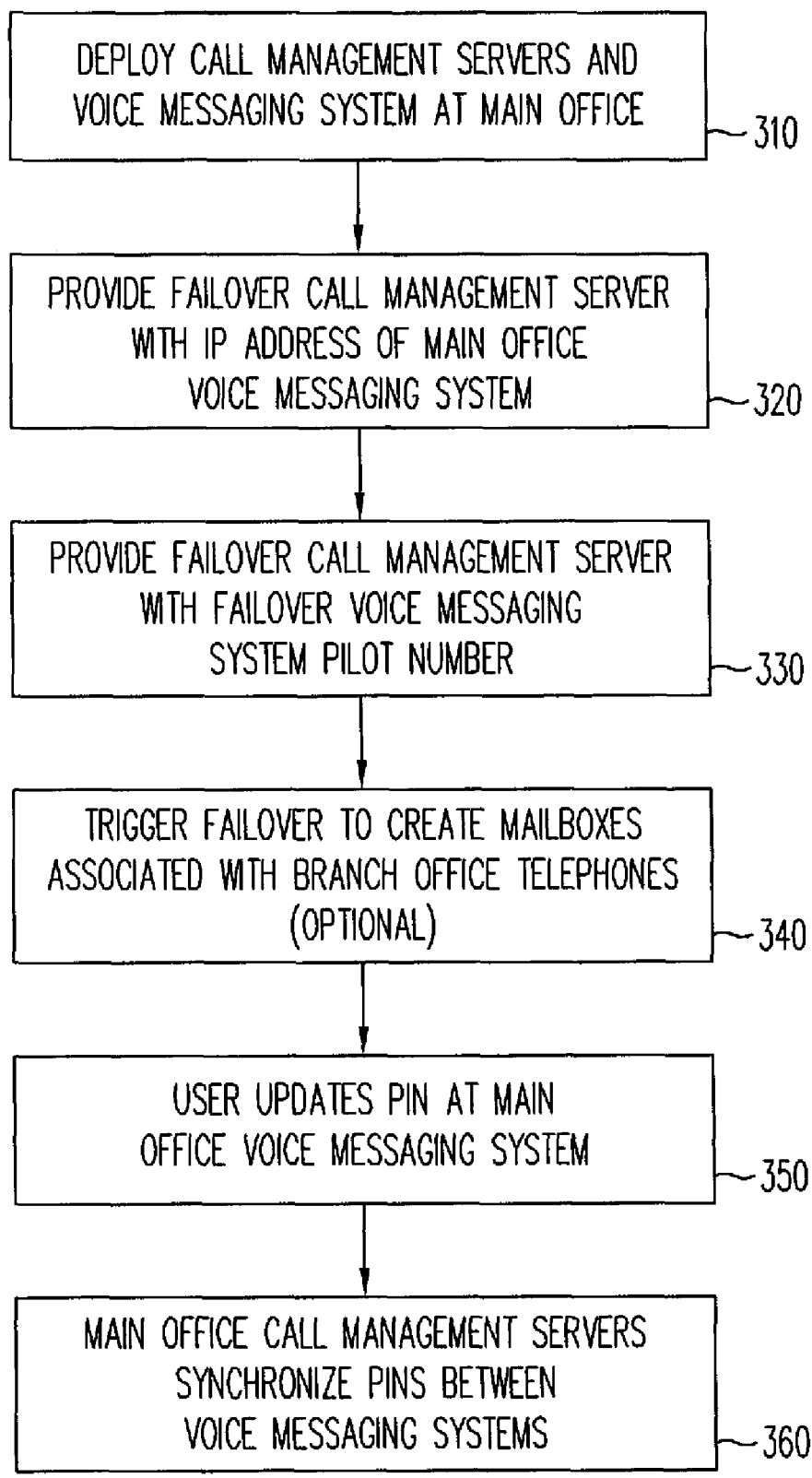
FIG. 3 illustrates a process of deploying the networked telephony system of FIG. 1 in accordance with an embodiment of the invention.

FIG. 3 illustrates a process of deploying networked telephony system 100 of FIG. 1 in accordance with an embodiment of the invention. In initial step 310, a system administrator deploys one or more call management servers 130 and voice messaging system 135 at main office 110. This may include, for example, the creation of mailboxes 140 with PINs associated with users of telephones 115 and 155.

In steps 320 and 330, the system administrator provides failover call management server 170 with an IP address associated with main office voice messaging system 135 (e.g., to permit synchronization of voicemail messages, PINs, and message statistics between voice messaging systems 135 and 175 as further described herein), and a telephone number associated with one or more general mailboxes 183 of failover voice messaging system 175. This telephone number is also referred to as a pilot number which may be used by failover call management server 170 to direct incoming calls to general mailbox 183 and/or access other services of failover voice messaging system 175 when WAN 190 is unavailable.

In optional step 340, failover is triggered and failover call management server 170 creates mailboxes 185 which are associated with telephones 155 of branch office 150. In this regard, step 340 may include associating each of mailboxes 185 with a PIN corresponding to one of mailboxes 140 previously created in step 340. For example, if a user of one of telephones 155 at branch office 150 is associated with one of mailboxes 140 having a particular PIN at main office 110, then the user may also be associated with one of mailboxes 185 having the same PIN. Alternatively, the provisioning of mailboxes 185 may be automatically performed in response to a forced or actual failover condition, or in response to particular incoming calls received by branch office 150 during a failover condition as further described herein with regard to FIG. 4.

Following step 340, if a user of one of branch office telephones 155 updates a PIN associated with one of mailboxes 140 at main office 110 (step 350), then call manager servers 130 may periodically instruct failover voice messaging system 175 to update the PIN associated with a corresponding one of mailboxes 185 at branch office 150, thereby synchronizing the PINs used between mailboxes 140 and 185 (step 360).

Figure 4A:
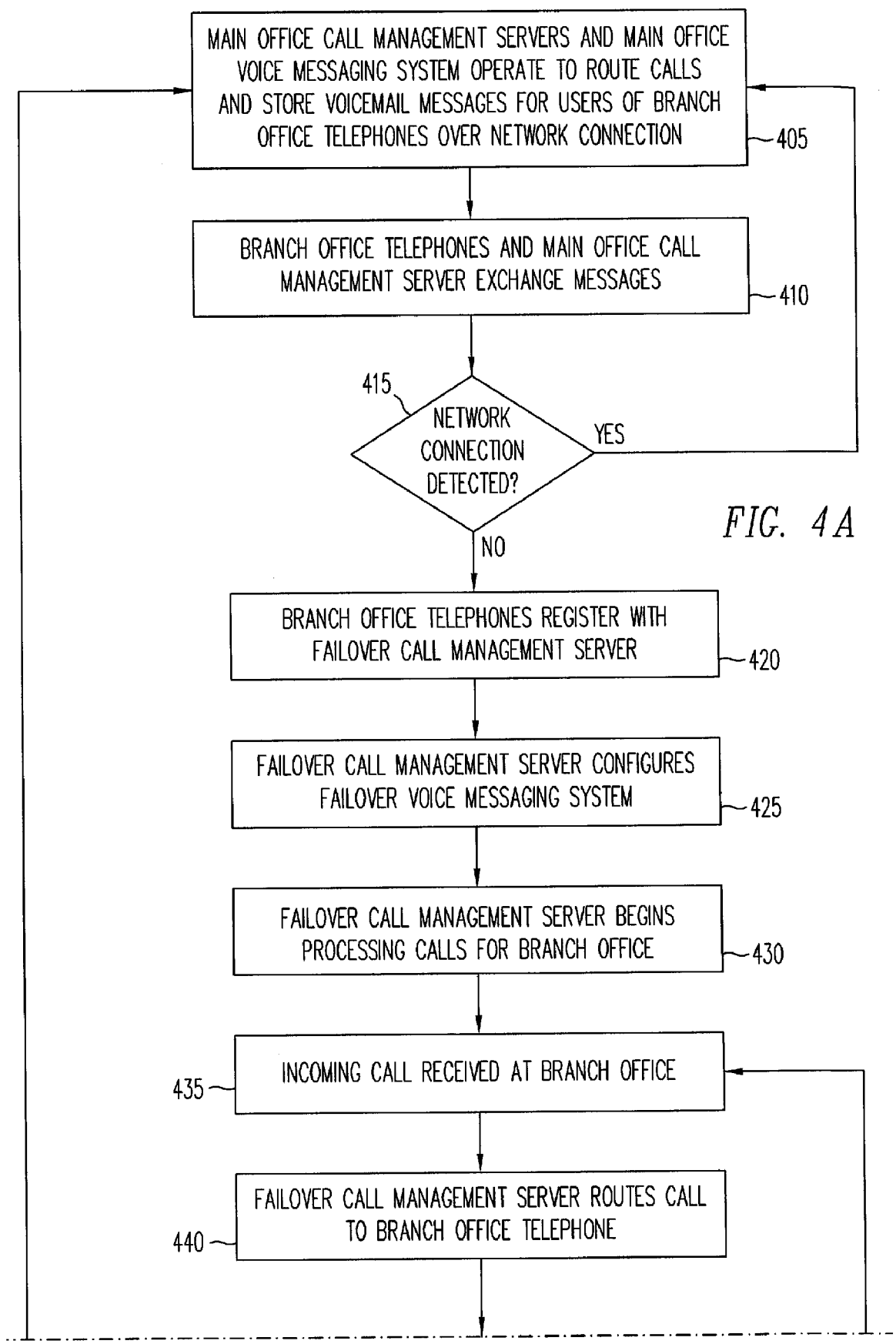
FIGS. 4 and 5 illustrate a process of operating the networked telephony system of FIG. 1 in accordance with an embodiment of the invention.
Figure 5:
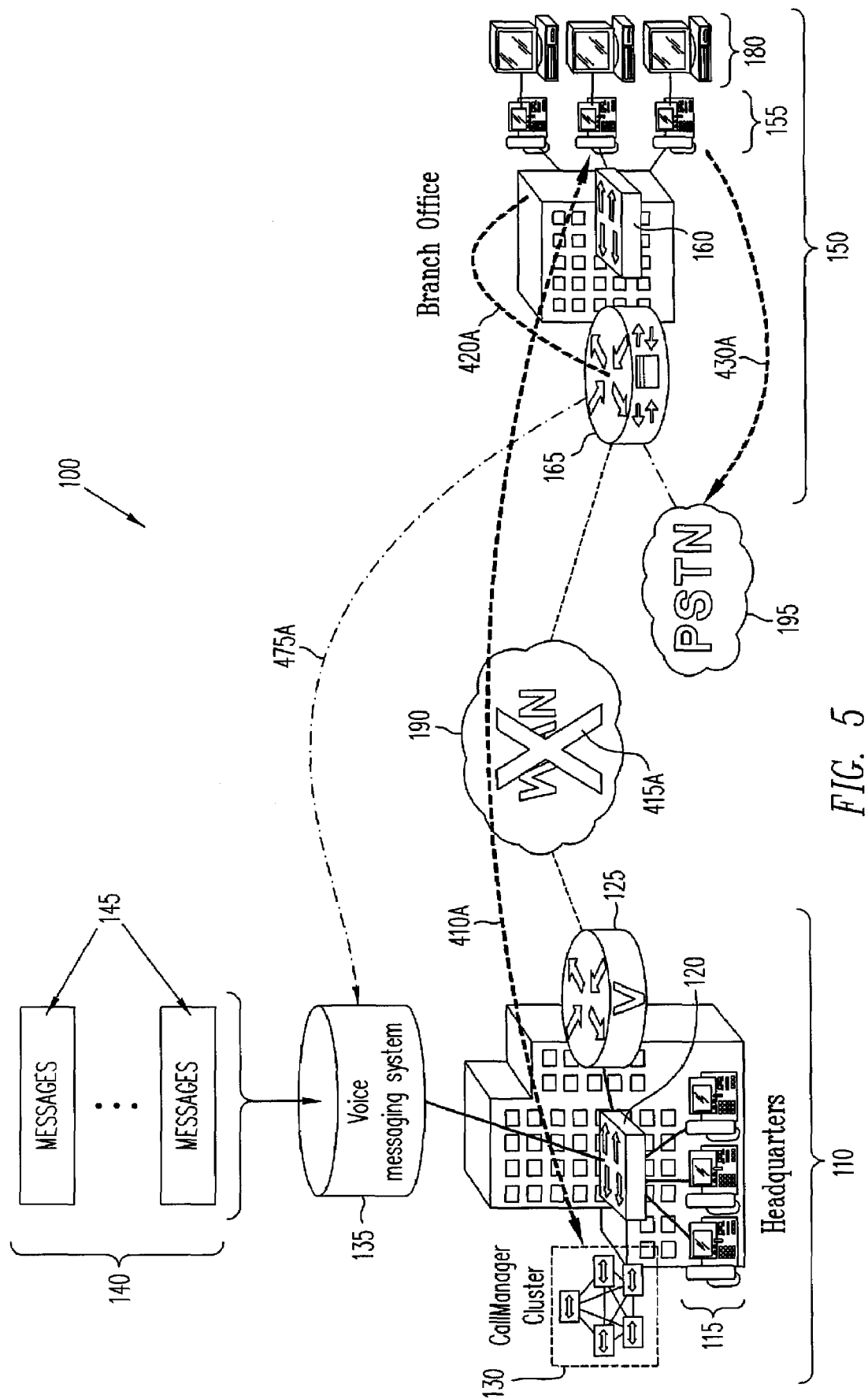

FIGS. 4 and 5 illustrate a process of operating networked telephony system 100 in accordance with an embodiment of the invention. During normal operation of system 100, call management servers 130 and voice messaging system 135 of main office 110 operate to route calls and store voicemail messages for users of branch office telephones 155 over WAN 190 as indicated by step 405 of FIG. 4. In this regard, it will be appreciated that voicemail messages for users of branch office telephones 155 may be stored as messages 145 in associated mailboxes 140 maintained by voice messaging system 135.

Also during this normal operation, branch office telephones 155 and main office call management servers 130 periodically exchange messages over WAN 190 in order to confirm the presence of a network connection between main office 110 and branch office 150 over WAN 190 (step 410) as denoted by arrow 410A of FIG. 5. If branch office telephones 155 successfully send and/or receive the messages of step 410, then a network connection over WAN 190 will be detected (step 415), and the process of FIG. 4 will return to step 405.

However, if branch office telephones 155 are unable to successfully send or receive the messages of step 410, then it will be assumed that the network connection between main office 110 and branch office 150 over WAN 190 has been interrupted (step 415) as denoted by the "X" 415A of FIG. 5. As a result, branch office telephones 155 will be unable to communicate with main office call management servers 130 and main office voice messaging system 135, and therefore will be unable to receive the services previously provided by main office 110 described above in step 405. In this case, the process of FIG. 4 will continue to step 420.

In step 420, branch office telephones 155 register with failover call management server 170 of branch office 150 as denoted by arrow 420A of FIG. 5. This may include, for example, sending a message from each of branch office telephones 155 to failover call management server 170 to request that failover call management server 170 provide backup call management services to branch office telephones 155 while WAN 190 is unavailable.

In response, failover call management server 170 configures failover voice messaging system 175 to provide backup voice messaging services while WAN 190 is unavailable (step 425). For example, in one embodiment, step 425 may include failover call management server 170 providing failover voice messaging system 175 with notification messages (for example, one or more Session Initiation Protocol (SIP) NOTIFY messages) to identify an IP address associated with main office voice messaging system 135 (previously received by failover call management server 170 of step 320 of FIG. 3). Step 425 may also include failover call management server 170 providing failover voice messaging system 175 with a request to create general mailbox 183, a pilot number associated with general mailbox 183 (previously received by failover call management server 170 in step 330 of FIG. 3), and a request to create mailboxes 185 associated with individual branch office telephones 155 that were registered in step 420.

Alternatively, mailboxes 183 and 185 may have been previously provisioned in step 340 of FIG. 3, or may be created in response to an incoming call routed to failover voice messaging system 175 as further described herein. Also in step 425, failover call management server 170 may query branch office telephones 155 for their associated configuration information and then configure itself to provide failover call management services.

The performance of steps 420 and 425 is further illustrated in FIG. 2. As shown in FIG. 2, one of branch office telephones 155 (associated in this example with telephone extension number 100) is shown providing a register message in accordance with step 420. In response, failover call management server 170 is shown providing appropriate notification messages in accordance with step 425.

As described above, steps 420 and 425 may be performed in response to the detection by one or more of branch office telephones 155 that WAN 190 is unavailable. In this regard, failover call management server 170 and failover voice messaging system 175 may be automatically configured to provide backup call management and voice messaging services without requiring any action by users of branch office telephones 155 or provisioning performed by system administrators in response to a WAN 190 connection failure. In particular, because mailboxes 183 and 185 may be provisioned by failover call management server 170, voicemail messages 187 associated with incoming calls subsequently processed by failover call management server 170 may be stored at branch office 150 despite the loss of main office services.

In step 430, failover call management server 170 begins processing telephone calls for branch office 150 as denoted by arrow 430A of FIG. 5. Accordingly, when an incoming call is received at branch office 150 (e.g., through PSTN 195) in step 435, failover call management server 170 proceeds to route the call to one of branch office telephones 155 in step 440. If a user of the branch office telephone 155 answers the call (step 445), then the user will handle the call and ultimately terminate the call when finished (step 450).

However, if the user does not answer a call routed by failover call management server 170 (step 445), then failover call management server 170 routes the call to failover voice messaging system 175 (step 455). As discussed above, mailboxes 183 and 185 may be optionally created in response to incoming calls routed to failover voice messaging system 175. Accordingly, step 455 may further include the provisioning of mailbox 183 or one of mailboxes 185 associated with an extension number corresponding to the particular branch office telephone 155 to which the incoming call of step 435 is directed. For example, in one embodiment, failover call management server 170 may issue the following SIP communications to failover voice messaging system 175 to request the provisioning of a mailbox 183 or 185:

---

INVITE sip: 6800@1.3.6.179:5060 SIP/2.0
Via: SIP/2.0/UDP 1.3.6.4:5060
From: "7010" <sip:7010@1.3.6.4>; tag = 691AE6E4-223C -continued

```
To: <sip:6800@1.3.6.179>
Contact: <sip:7010@1.3.6.4:5060>
Diversion: <sip:5010@1.3.6.4>; reason = no-answer; counter = 1
```

In the example SIP communications above, the "INVITE" communication is used to set up failover voice messaging system 175 with pilot number "6800." The "Via" communication provides a protocol header to identify message routing information. The "From" communication identifies that a party identified as "7010" is calling the extension on failover voice messaging system 175. The "To" communication provides a protocol header identifying the pilot number. The "Contact" communication provides a protocol header identifying the caller. The "Diversion" communication provides a protocol header identifying a mailbox extension number (here "5010") for which message is being left.

In step 460, failover voice messaging system 175 stores a message 187 in one of mailboxes 185 associated with the particular branch office telephone 155, or in mailbox 183 (in the case of an incoming call routed to a general branch office extension or if only a single mailbox 183 is provided for branch office 150). Thereafter, users of branch office telephones 155 may access messages 187 stored in mailboxes 183 and 185 by failover voice messaging system 175 using appropriate PINs or telephone numbers associated with mailboxes 183 and 185 (step 465).

Branch office telephones 155 continue to monitor WAN 190 by, for example, attempting to exchange messages with main office 110 (step 470). If WAN 190 remains unavailable, then the process of FIG. 4 returns to step 435 where incoming calls continue to be processed by failover call management server 170 and failover voice messaging system 175 until the network connection between main office 110 and branch office 150 is restored.

After the network connection is restored, failover voice messaging system 175 synchronizes with main office voice messaging system 135 in step 475 as denoted by arrow 475A of FIG. 5. For example, during step 475, messages 187 stored by mailboxes 183 and 185 of failover voice messaging system 175 may be transferred to corresponding mailboxes 140 of main office voice messaging system 135 over the newly restored network connection provided by WAN 190 using, for example, Voice Profile for Internet Mail (VPIM) networking techniques. As a result, messages 187 previously stored at branch office 110 will now be stored as messages 145 at main office 110. Accordingly, message waiting indicators (MWIs) which may be included in branch office telephones 155 will continue to properly reflect the existence of one or more voicemail messages (now stored as one of messages 145 at branch office 110).

Also in step 475, failover voice messaging system 175 may forward message statistics to main office voice messaging system 135. Such statistics may include, for example, flags associated with new, urgent, or private messages, message envelope information, and PIN number changes. For example, if users of telephones 155 have changed the PINs of their associated mailboxes 185 while WAN 190 was unavailable, then step 475 may include synchronizing the PINs of mailboxes 140 at main office 110 to conform to any newly updated pins of mailboxes 185 at branch office 150.

Following step 475, the process of FIG. 4 will return to step 405 where main office call management servers 130 and main office voice messaging system 135 operate to route calls and store voicemail messages for users of branch office telephones 155 over WAN 190. Failover voice messaging system 175 may optionally remove messages 187 from mailboxes 183 and 185 if desired to reduce resources used by failover voice messaging system 175.

In one embodiment, if users of branch office telephones 155 are accessing mailboxes 183 or 185 (e.g., performing step 465) while WAN 190 connectivity is restored (step 470), then system 100 may be configured to refrain from redirecting such users back to main office voice messaging system 135 until after such access is completed. In this regard, failover voice messaging system 175 may continue to maintain one or more of messages 187 in mailboxes 183 and 185 after WAN 190 connectivity is restored to permit users of branch office telephones 155 finish any current use of failover voice messaging system 175.

In view of the present disclosure, it will be appreciated that users of branch office telephones 155 may use main office voice messaging system 135 while WAN 190 is operational. This configuration allows an enterprise using networked telephony system 100 to easily scale main office call management servers 130 and main office voice messaging system 135 as may be desired to handle the call routing and handling requirements of users located at main office 110 and one or more branch offices 150. In addition, this configuration can permit remote users to continue to use mailboxes 140 at main office 110 when relocating between main office 110 and/or different branch offices 150.

It will also be appreciated that the use of failover call management server 170 and failover voice messaging system 175 as described herein can provide transparent call routing and voice messaging services to users of branch office telephones 155 in the event of a WAN 190 communication interruption. Because the provisioning of mailboxes 183 and 185 can be performed by failover call management server 170 in response to a detected communication interruption or the receipt of individual incoming calls during such interruptions, failover voice messaging services can be provided at one or more branch offices 150 without requiring users or system administrators to implement such changes.

In addition, by synchronizing messages stored by failover voice messaging system 175 with main office voice messaging system 135 after WAN 190 communication is restored, users of branch office telephones 155 can continue to access voicemail messages stored during the interruption without requiring users or system administrators to perform additional configuration or provisioning steps after communication has been restored. Advantageously, the branch office 150 resources consumed by failover call management server 170 and failover voice messaging system 175 can be minimized by provisioning mailboxes 183 and 185 only during WAN 190 failover conditions, and by subsequently removing mailboxes 183 and 185 after synchronization with mailboxes 140 over a restored WAN 190 network connection.

Where applicable, various embodiments provided by the present disclosure can be implemented using hardware, software, or combinations of hardware and software. Also where applicable, the various hardware components and/or software components set forth herein can be combined into composite components comprising software, hardware, and/or both without departing from the spirit of the present disclosure. Where applicable, the various hardware components and/or software components set forth herein can be separated into sub-components comprising software, hardware, or both without departing from the spirit of the present disclosure. In addition, where applicable, it is contemplated that software components can be implemented as hardware components, and vice-versa.

Software in accordance with the present disclosure, such as program code and/or data, can be stored on one or more computer readable mediums. It is also contemplated that software identified herein can be implemented using one or more general purpose or specific purpose computers and/or computer systems, networked and/or otherwise. Where applicable, the ordering of various steps described herein can be changed, combined into composite steps, and/or separated into sub-steps to provide features described herein.

Therefore, it should be understood that the invention can be practiced with modification and alteration within the spirit and scope of the appended claims. The description is not intended to be exhaustive or to limit the invention to the precise form disclosed. It should be understood that the invention can be practiced with modification and alteration and that the invention be limited only by the claims and the equivalents thereof.

What is claimed is:

1. A method comprising:
    detecting a network communication interruption between a branch office and a main office;
    provisioning a mailbox of a failover voice messaging system of the branch office;
    receiving an incoming call at the branch office;
    routing the incoming call to the mailbox;
    storing a message associated with the incoming call in the mailbox;
    detecting a restored network connection between the branch office and the main office;
    synchronizing the message between the mailbox of the failover voice messaging system of the branch office and a corresponding mailbox of a voice messaging system of the main office in response to the restored network connection;
    registering a telephone of the branch office with a failover call management server of the branch office in response to the network communication interruption, wherein the mailbox of the failover voice messaging system is associated with the telephone;
    provisioning an additional mailbox of the failover voice messaging system of the branch office;
    registering an additional telephone of the branch office with the failover call management server of the branch office in response to the network communication interruption, wherein the additional mailbox of the failover voice messaging system is associated with the additional telephone;
    receiving an additional incoming call at the branch office;
    routing the additional incoming call to the additional mailbox;
    storing an additional message associated with the additional incoming call in the additional mailbox; and
    synchronizing the additional message between the additional mailbox of the failover voice messaging system of the branch office and a corresponding additional mailbox of the voice messaging system of the main office in response to the restored network connection.

2. The method of claim 1, further comprising removing the message from the mailbox of the failover voice messaging system following the synchronizing.

3. The method of claim 1, further comprising synchronizing a user personal identification number (PIN) between the mailbox of the failover voice messaging system and the corresponding mailbox of the main office in response to the restored network connection.

4. The method of claim 1, further comprising synchronizing message statistics between the mailbox of the failover voice messaging system and the corresponding mailbox of the main office in response to the restored network connection.

5. The method of claim 1, wherein the provisioning is performed in response to the network communication interruption.

6. The method of claim 1, wherein the provisioning is performed in response to the incoming call.

7. The method of claim 1, wherein the mailbox is a general mailbox associated with a pilot number of the branch office.

8. A method comprising:
    detecting a network communication interruption between a branch office and a main office;
    provisioning a mailbox of a failover voice messaging system of the branch office;
    receiving an incoming call at the branch office;
    routing the incoming call to the mailbox;
    storing a message associated with the incoming call in the mailbox;
    detecting a restored network connection between the branch office and the main office;
    synchronizing the message between the mailbox of the failover voice messaging system of the branch office and a corresponding mailbox of a voice messaging system of the main office in response to the restored network connection;
    registering a telephone of the branch office with a failover call management server of the branch office in response to the network communication interruption, wherein the mailbox of the failover voice messaging system is associated with the telephone;
    provisioning an additional mailbox of the failover voice messaging system of the branch office;
    registering an additional telephone of the branch office with the failover call management server of the branch office in response to the network communication interruption, wherein the additional mailbox of the failover voice messaging system is associated with the additional telephone;
    receiving an additional incoming call at the branch office;
    routing the additional incoming call to the additional mailbox;
    storing an additional message associated with the additional incoming call in the additional mailbox;
    synchronizing the additional message between the additional mailbox of the failover voice messaging system of the branch office and a corresponding additional mailbox of the voice messaging system of the main office in response to the restored network connection; and
    wherein the provisioning of the mailboxes of the failover voice messaging system is performed in response to the registering of each of the telephones, respectively.

9. A system comprising:
    a failover call management server adapted to process telephone calls received by a branch office during a network communication interruption between the branch office and a main office;
    a failover voice messaging system;
    a mailbox maintained by the failover voice messaging system and adapted to store a message associated with one of the telephone calls, wherein the failover voice messaging system is adapted to synchronize the message between the mailbox of the failover voice messaging system of the branch office and a corresponding mailbox of a voice messaging system of the main office in response to a restored network connection between the branch office and the main office;

a telephone associated with the mailbox of the failover voice messaging system;

an additional mailbox maintained by the failover voice messaging system and adapted to store an additional message associated with an additional one of the telephone calls;

an additional telephone associated with the additional mailbox of the failover voice messaging system; and wherein the failover voice messaging system is further adapted to synchronize the additional message between the additional mailbox of the failover voice messaging system of the branch office and additional of the voice messaging system of the main office in response to the restored network connection.

10. The system of claim 9, wherein the failover voice messaging system is further adapted to remove the message from the mailbox of the failover voice messaging system after the message is synchronized.

11. The system of claim 9, further comprising a network gateway connected with a wide area network wherein the failover call management server and the failover voice messaging system are integrated with the gateway.

12. The system of claim 9, wherein the failover voice messaging system is further adapted to synchronize a user personal identification number (PIN) between the mailbox of the failover voice messaging system and the corresponding mailbox of the main office in response to the restored network connection.

13. The system of claim 9, wherein the failover voice messaging system is further adapted to synchronize message statistics between the mailbox of the failover voice messaging system and the corresponding mailbox of the main office in response to the restored network connection.

14. The system of claim 9, wherein the failover call management server is adapted to provision the mailbox in response to the network communication interruption.

15. The system of claim 9, wherein the failover call management server is adapted to provision the mailbox in response to the one of the telephone calls.

16. The system of claim 9, wherein the mailbox is a general mailbox associated with a pilot number of the branch office.

\* \* \* \* \*